US006895042B2

(12) United States Patent
Roos

(10) Patent No.: US 6,895,042 B2
(45) Date of Patent: May 17, 2005

(54) APPARATUS AND METHOD FOR PRE-PROVISIONING OF BROADBAND ACCESS TO SUBSCRIBERS IN A TELECOMMUNICATION SYSTEM

(75) Inventor: Sture Roos, Bergshamra (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 691 days.

(21) Appl. No.: 09/732,878

(22) Filed: Dec. 11, 2000

(65) Prior Publication Data

US 2002/0057732 A1 May 16, 2002

(30) Foreign Application Priority Data

Nov. 3, 2000 (SE) .............................................. 0004038

(51) Int. Cl.⁷ ................................................. H04B 1/38
(52) U.S. Cl. ...................... 375/222; 370/261; 370/352; 370/60.1; 379/211; 379/98
(58) Field of Search ........................... 375/222; 370/261, 370/352, 60.1; 379/98, 211, 59, 93.14; 455/403

(56) References Cited

U.S. PATENT DOCUMENTS

| | | | |
|---|---|---|---|
| 4,245,342 A | | 1/1981 | Entenman |
| 5,428,608 A | * | 6/1995 | Freeman et al. ............ 370/261 |
| 5,475,735 A | * | 12/1995 | Williams et al. ............ 455/403 |
| 5,883,941 A | | 3/1999 | Akers |
| 5,970,088 A | | 10/1999 | Chen |
| 5,982,768 A | | 11/1999 | Bellenger et al. |
| 6,014,431 A | | 1/2000 | McHale et al. |
| 6,141,356 A | | 10/2000 | Gorman ...................... 370/493 |
| 6,169,788 B1 | * | 1/2001 | McHale et al. .......... 379/93.14 |
| 6,373,936 B1 | | 4/2002 | Raniere et al. ............. 379/202 |
| 6,385,203 B2 | | 5/2002 | McHale ...................... 379/401 |
| 6,434,221 B1 | | 8/2002 | Chong ..................... 379/27.01 |
| 6,636,931 B2 | | 10/2003 | Shah et al. ................. 710/317 |

FOREIGN PATENT DOCUMENTS

| | | |
|---|---|---|
| EP | 0 690 597 A1 | 1/1996 |
| EP | 0 893 934 A1 | 1/1999 |
| SE | 511 812 C2 | 11/1999 |
| WO | 97/37458 A2 | 10/1997 |

OTHER PUBLICATIONS

Goralski, "ADSL and DSL Technologies", ADSL and DSL Technologies, New York, McGraw–Hill, US, 1998, pp. 174–179, 219, 223–224, 252–253, 256–258, 262, 265 and 268.

EP Office Action mailed Oct. 4, 2001 in corresponding EP application 00850203.1–1525.

International Search Report mailed Jan. 30, 2002 in corresponding PCT application PCT/SE01/02404.

EP Office Action mailed Dec. 23, 2002 in corresponding EP application 00850203.1–1525.

U.S. Appl. No. 09/741,741, filed Dec. 21, 2000 entitled "Apparatus and Method for Provision of a Back–Up Connection in a Telecommunication System".

U.S. Appl. No. 09/732,879, filed Dec. 11, 2000 entitled "Apparatus and Method for Provision of a Broadband Access in a Telecommunication System".

* cited by examiner

Primary Examiner—Shuwang Liu
Assistant Examiner—Eva Zheng
(74) Attorney, Agent, or Firm—Nixon & Vanderhye P.C.

(57) ABSTRACT

An apparatus in a telecommunication system provides access to telecommunication services to subscribers at user terminals. Each of terminal is separately connected to an access point via high speed modems and a communication network. The access point includes high speed modems with filters. The invention permits a large number of subscribers to be connected in a short period of time, and the subscribers can consider the establishment of the connection as plug-and-play. Moreover, when one initial access point is filled, subscribers are transferred to other access points, whereby room is made available for new subscribers.

17 Claims, 4 Drawing Sheets

APPARATUS AND METHOD FOR PRE-PROVISIONING OF BROADBAND ACCESS TO SUBSCRIBERS IN A TELECOMMUNICATION SYSTEM

TECHNICAL FIELD

The present invention relates to an apparatus and a method in a telecommunication system for providing access to telecommunication services to subscribers at user terminals, each of which being separately connected to at least one access point via high speed modems and a communication network, the at least one access point comprising high speed modems and related filters.

BACKGROUND

Internet and its related customer services has had an enormous break through during the last decade. Even though the early stages of what has become the Internet of today were almost unknown only ten years ago, at least among ordinary technically oriented people, the Internet of today is virtually known to everyone in the so-called industrialised world. Everyday, the number of people practising and using the Internet is increasing. Many people use it professionally, such as use in offices and laboratories, but also other kinds of use increases rapidly, such as daily use in people's residences.

Customer services developed that are mainly designed for and are well-adapted to new possibilities governed by the Internet have increased at correspondingly fast pace. As a consequence of the increasing possibilities provided by higher data transmission rates and the enhanced image quality and even on-line video over the Internet, to mention just two conceivable applications among many others, a great demand for higher transmission rates has grown among by potential customers, i.e. future subscribers, which has led to a new and currently developing market including significant business opportunities for several involved parties. The customers may for instance be multimedia interested people who want to be able to download real time video or transfer large amounts of data, such as very high resolution images, music files, etc, to and from computers in their homes. A market challenge it to be able to provide high transmission access to the Internet for every customer who is or might become interested.

In order to provide all of these customers with connections supporting very high transmission rates, preferably bi-directional transmission exceeding 2 Mbit per second, which is sometimes called broadband access according to one of a plurality of definitions, a technique allowing for non-problematic mass-installation is required. Preferably, customers who receive and perhaps immediately accept an offer from a provider of high speed transmission access should be able to receive the high speed access to the Internet within a very short period of time. Otherwise customers will become unsatisfied and in some cases, they will even have a legal right to cancel the agreement of having accepted the high speed transmission offer, or renegotiate the terms of the agreement.

Prior art, like for instance the European patent application PE 0 981 242 A1, discloses a shared multi-drop ADSL modem allowing for simultaneous connections to at least two local loops. Two subscribing users may share one single ADSL modem, whereby lower costs associated with the implementation of ADSL modems can be achieved.

However, the prior art does not disclose a satisfactory solution to the problem of installing and activating connections for a great number of subscribers wanting access to the Internet at high transmission rates, so-called broadband, in a short period of time. Moreover, to use only a minimum of staff at convenient working hours is an absolute prerequisite not only for enabling commercial success when mass-connecting and activating the subscribing customers. Perhaps the most serious drawback associated with prior art is that mass-connection of customers having accepted an agreement of provision of high speed Internet access will take time and hence be a serious bottleneck when a huge number of subscribers simultaneously are about to get connected and activated and most subscribers do not accept having to wait.

SUMMARY OF THE INVENTION

One object of the present invention is to alleviate the previously mentioned problems associated with prior art technology. This object is achieved by means of an apparatus and a method in a telecommunication system for providing access to telecommunication services to subscribers at user terminals, each of which being separately connected to at least one access point via net terminal including xDSL compatible modems, and a communication network, the at least one access point comprises xDSL compatible modems with filers, access point modems are arranged in two groups, the first group including a plurality of xDSL compatible modems with access via filters; the second group including a plurality of xDSL compatible with direct access the net terminal is provided with a second modem for initial installation of the connection which is monitored and controlled by a control means until connection is established, characterized in that the control means is adapted to control the modems and the filters when at least one connection between the user terminal and the access point is transferred from being accessed via the first group of pooled xDSL compatible modems with associated filters, to being accessed directly via the second group of xDSL compatible modems, whereby a new pre-provisional broadband access point is made available.

One advantage of the apparatus and method according to the invention is a plug-and-play possibility for the customer himself to access xDSL with transmission at broadband rates. By means of the invention, the currently connected subscribing customer has immediate access to the Internet and is instantly able to use its customer services provided over a broadband access technology.

Another object is to solve the problem of monitoring the great number of connected and installed subscriber equipment. This problem is solved in that a management system is provided to process retrieved additional user information whereby the established connection can be adapted according to user specifications.

Yet another advantage of the present invention is that no bottlenecks will occur when mass-installing and activating new subscribing broadband customers. The customers are already connected when accepting a received offer of becoming subscribers. Transfer of subscribers to another access point in the communication system can be made at a time convenient to the operator and its staff, whereby working conditions for technical installation staff can be improved.

BRIEF DESCRIPTION OF THE DRAWINGS

The above and further features, advantages and benefits of the present invention will be apparent upon consideration of the following detailed description, taken in conjunction with the accompanying drawings, in which like reference characters and figures refer to like parts throughout, and in which.

DETAILED DESCRIPTION OF EMBODIMENTS

Figure 1:
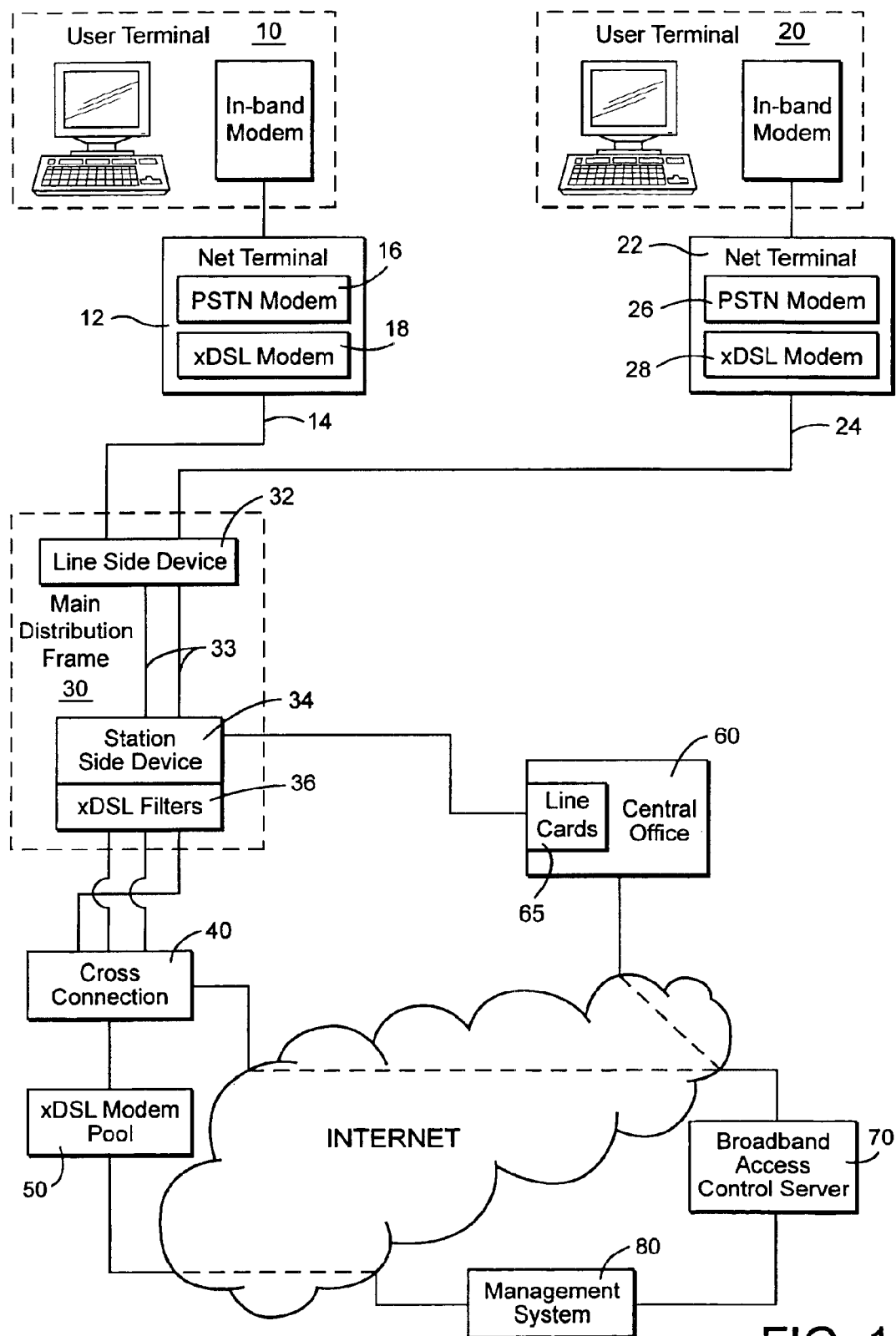
FIG. 1 illustrates a schematic view of one embodiment of the apparatus according to the present invention.

The following description is of the best mode presently contemplated for practising the invention. The description is not to be taken in a limiting sense, but is made merely for the purpose of describing the general principles of the invention. The scope of the invention should be ascertained with reference to the issued claims.

Copper wires, such as twisted wire pairs between a telephone exchange and different users of telecommunication services have more a lot more information capacity that the capacity currently used for voice services. Telephones and connected copper wires together with telephone exchanges from the usual telephone network, which is referred to as the PSTN (public stationary telephone network). The PSTN has been build-up during several decades and constitutes an already existing and widely distributed communication network. However, as mentioned above, it can be utilised more effectively than almost exclusively for transmission of voice traffic, which is the current situation. Today many users are connected to the Internet via PSTN by a modem connection, but the transmission rates are not very high and therefore constitute a limiting factor. Several base band and pass band transmission systems, collectively referred to as xDSL, have been developed over the past decade that enable up to several megabits per second, which is several orders of magnitude higher transmission than today's PSTN modem connections. This much higher transmission is also carried over telephone twisted pair loops within the PSTN, i.e. over the already in-place copper cables, which network in most cases is owned by telephony providing companies. The PSTN covers the access to the telecommunication system of for most of the potential subscribers of broadband access to data transmission services all over the world. The twisted pair cables made from copper are used for the connection of different end users with a central office.

Due to the above mentioned principally commercial reasons, much of the efforts put down in development of new signal processing techniques has been directed to the objective to use these in-place copper cables. This because substituting them by data transmission lines with a higher bandwidth, like for instance optical glass fibres, would have taken longer time and would also be extremely costly. By means of organising signals, e.g. into ATM (asynchronous transfer mode) data, voice and video signals can be allowed to be carried in a common xDSL payload, which will be described in the following.

The term xDSL is a generic term for a number of similar forms of DSL (digital subscriber line) technologies. The "x" in xDSL is arbitrary and depends on the implemented technology. Two of the major types of used technologies are HDSL (high bit rate digital subscriber line) and ADSL (asynchronous digital subscriber line) but VDSL and SDSL are other similar common technologies included in the generic term xDSL. xDSL processed signals are designed to maximise the rate of transmission of digital signals through subcategories of non-loaded twisted pairs, making use of bandwidths that can be greater than 1 MHz.

FIG. 1 schematically illustrates a first embodiment of the apparatus improving the telecommunication system. In FIG. 1 two user terminals 10, 20 are illustrated, each of which is separately connected to a net terminal 12, 22. The net terminal 12, 22 operatives as a gateway between the user terminal 10, 20 and the XDSL enhanced telephone network begins at the wall socket and continues outside of the building of the user terminals 10, 20 with cooper cables and telephone exchanges. The net terminal 12, 22, including at least one PSTN modem 16, 26 and an xDSL modem 18, 28, provides the user terminal 10, 20 and its subscribing user with access to XDSL services. From the net terminal 12, 22 a copper pair cable 14, 24 leads to a main distribution frame 30, which is divided into two devices, i.e. the line side device 32 and the station side device 34. The two devices of the main distribution frame 30 are preferably integrated and connection between the line side device 32 and the station side device 34 is done by means of so-called jumpers 33. In prior art, these jumpers 33 usually must be manually re-connected in a plurality of combinations depending on in which manner customers of a provider of communication services, a so-called operator, are willing to subscribe to the operator's various customer services.

In order for an xDSL modem to function, a filter must be provided. According to the present invention, a filter arrangement 36 is arranged in the station side device 34 of the main distribution frame 30 containing one filter per expected or potential user terminal 10, 20 to connect to the PSTN via a provided xDSL customer service. Hereby no so-called re-jumpering, i.e. disconnection and then re-connection of a jumper, is required since each potential user in theory is provided with the xDSL service in advance, even though the service must not have been fully realized by final activation of the connection. One example is that the subscriber has not yet received his own net terminal 12, 22. Installation of a filter arrangement 36 is easy and does not require technically trained staff, since user tables or other more or less complicated registers of already connected jumpers and jumpers to be connected or disconnected to a particular connector is no longer necessary. In addition to that advantage, the time of installation can be significantly reduced.

The output of each filter in the filter arrangement 36 is connected to a separate modem in a modem pool 50 via a metallic cross connector 40. The modem pool 50 consists of a number of separate modems corresponding to the number of filters of the filter arrangement 36. An arrangement like the above mentioned solves the problem of keeping order among the connecting wires. More in detail, what is meant is the present need of separating a wire connecting a particular filter of the filter arrangement 36 to a particular modem of the modem pool 50. According to the invention, it is no longer crucial to keep the order when connecting the wires that may even be intersected without effecting the functionality and operation of the wire installation. These improvements in relation with prior art technology simplify the installation for staff of the communication service provider and further reduces the time needed for installation, which is beneficial for the operator as well as for the communication service provider.

The net term 12, 22 also includes an in-band modem, like for instance a standard V.90 modem. By means of this standard modem, an initial connection is established with a broadband access control server 70. The initial connection is established with the broadband access control server 70 via the station side 34 of the main distribution frame 30 and a central office 60. The central office 60 has an arrangement of line cards 65 including several state of the art access possibilities and transmission techniques, such as for instance PSTN and ISDN. The connection from the central office 60 to the broadband access control server 70 is via the Internet, whereby an communicative internet protocol is used, such as the well-known protocol TCP/IP. When the broadband access control server 70 has been connected, it transfers information required for initializing xDSL by means of the modem pool 50 to the metallic cross connection 40.

A further possibility is that the broadband access control server 70 also retrieves user information in the form of a plurality of user specific parameters, in order to get the net terminal 12, 22 and the specific modem of the xDSL modem pool 50 to operate in a way expected by the customer. In one embodiment, the broadband access control server 70 is supported by a management system 80 for providing the metallic cross connection 40 and the modem pool 50 with user specific instructions, whereby the functionality can be adapted to requirements of each specific user of the xDSL connected user terminal 10, 20. In case of applying a management system 80, it communicates with either of, or with both of the metallic cross connection 40 and the xDSL modem pool 50 via the Internet. However, in another embodiment according to the invention, the tasks of the management system 80 are performed by the broadband access control server 70.

Figure 2:
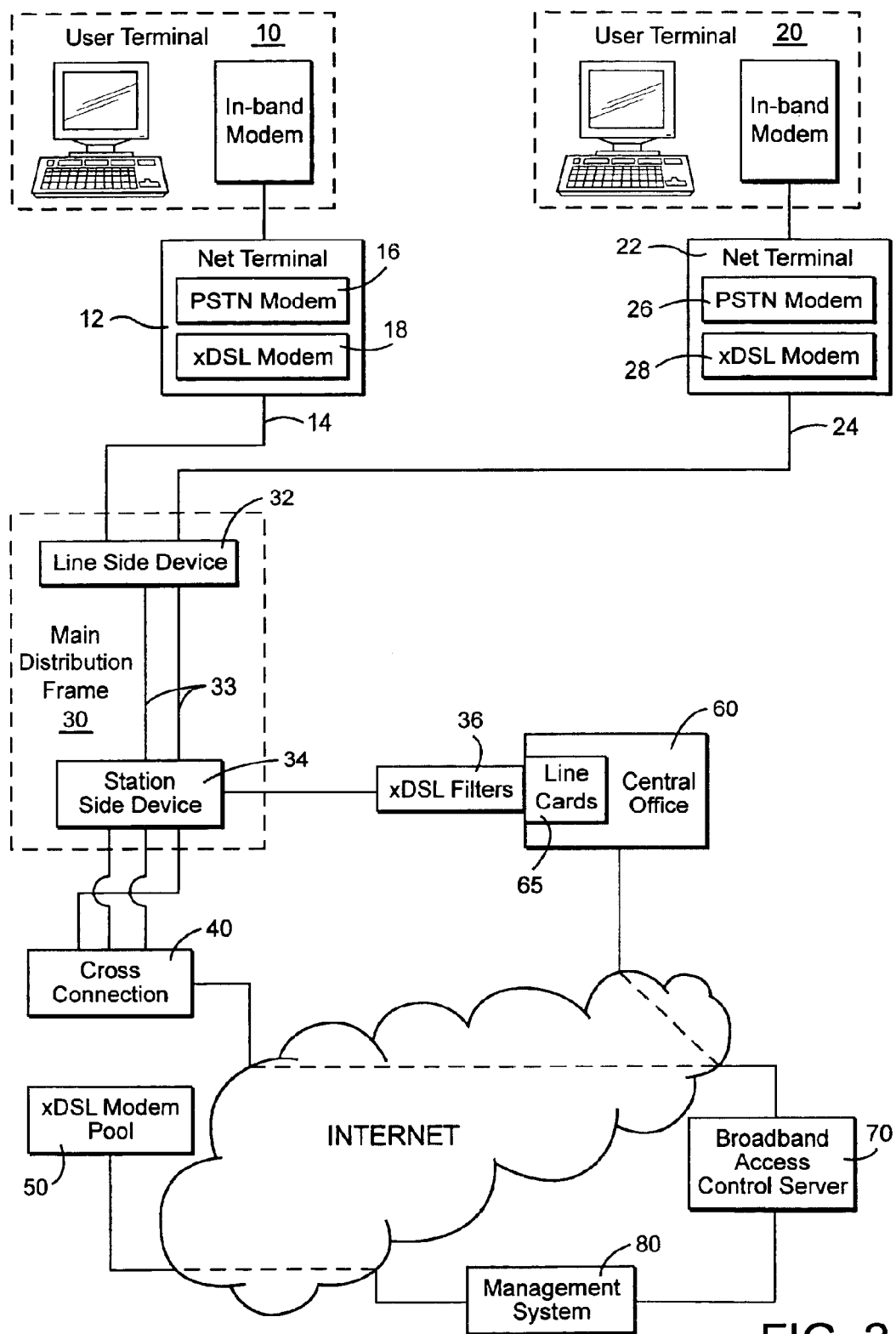
FIG. 2 illustrates a schematic view of another embodiment of the apparatus according to the present invention.

According to a second embodiment and with reference to FIG. 2, the filter arrangement 36 is connected directly in front of the connectors of the line cards 65 instead of in the main distribution frame 30. One advantage of an arrangement like that is the space saved in the main distribution frame 30. In many cases there is lack of space in the main distribution frame 30, whereas the central office 60 provides more space. Another advantage is that centralisation of filter arrangements 36 means less distributed locations, which is beneficial for service and maintenance reasons.

Figure 3:
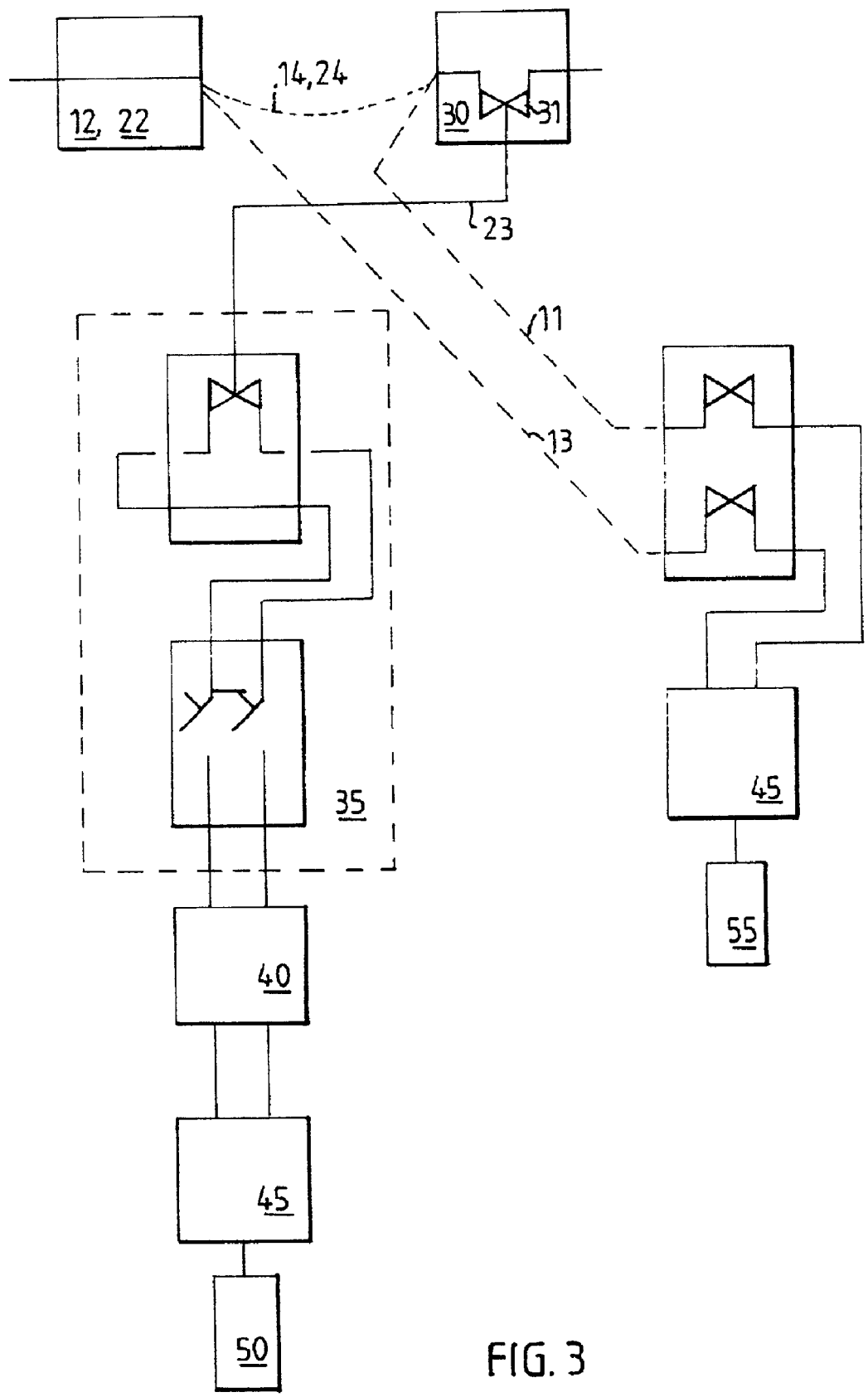
FIG. 3 illustrates a schematic view of how pre-provisioning of broadband access for potential subscribers is realised according to the present invention.

FIG. 3 illustrates a schematic view of how pre-provisioning of broadband access for potential subscribers is realised according to the present invention. The net terminal 12, 22 includes both a standard PSTN modem 16, 26 and an xDSL modem 18, 28 and is able to communicate with the main distribution frame 30 via a copper pair cable 14, 24 (dotted line) of the PSTN. Potential subscribers are connected to one of the modem pools 50 by means of so-called patch cords 23 (full line). These connections are between the modem pool arrangement 35, 40, 45, 50 and the station side 34 of the main distribution frame 30. Connection is made via a break function 31 of the main distribution frame 30, from which both the net terminal 12, 22 and the station side equipment is reached. In prior art, the connection is broken when connecting the patch cord 23, but according to the present invention, this problem is solved in that the other end of the patch cord 23 is connected first to a loop-back function 35, so as not to break the connection. After the loop-back function 35 is placed the metallic cross connection 40, which is designed in a way that the line side pair cable and the station side pair cable are coupled through when connecting the metallic cross connection 40. Both of the metallic cross connection 40 and the loop-back function 35 can be remotely controlled by either of, or by both of the subscriber or the operator of the present communication services.

Moreover, and still with reference to FIG. 3, the modems are divided into two groups, i.e. one group for direct access and another for access to a modem pool 50, via a split filter arrangement 45. By way of this division of modems into two groups, the operator is able to use patch cords 23 to connect potential customers to the modem pool 50 via the metallic cross connection 40 and the loop-back function 35. After having patch cord connected potential customers, marketing activities of high speed broadband access can be directed exclusively towards these potential customers. As customers accept the offer and the modem pool 50 is about to get occupied by new subscribers, these can be transferred from the modem pool 50 to the directly connected and accessible modems 55 via new cords 11, 13 (striped lines). This transfer of subscribers can be made during working hours convenient for the operator, and must not be made for each new subscriber individually. Due to the present invention, the number of technically trained staff members of the operator can be reduced, at the same time their efficiency is enhanced and thus, their working situations can be improved. As subscribers are transferred to direct modems 55, room is made for new broadband access subscribers. Eventually, when every interested subscriber has been transferred, the metallic cross connection 40 can be removed and be used at another location where it is currently needed.

Figure 4:
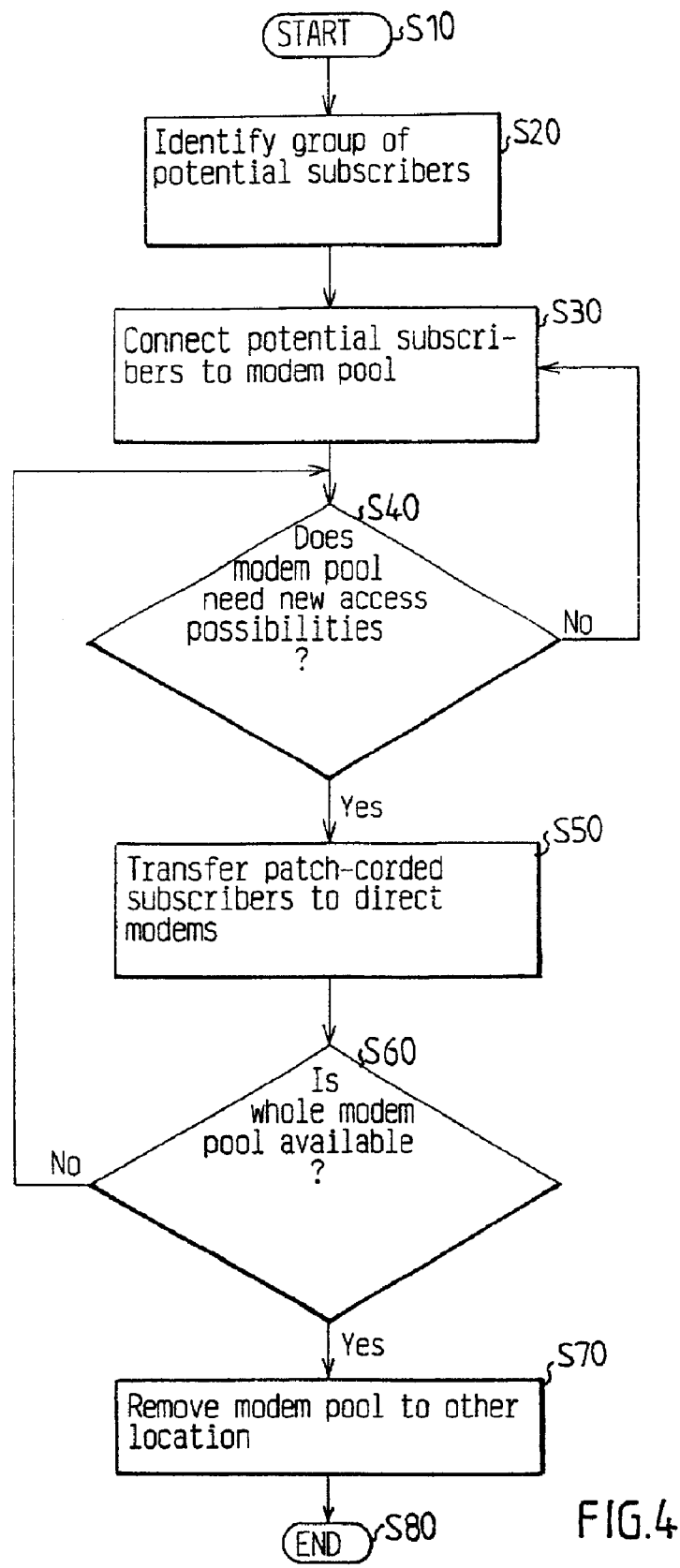
FIG. 4 is a flow chart illustrating the procedure how of subscribers can be connected to a high speed transmission connection established by means of the present invention.

FIG. 4 is a flow chart illustrating the procedure how of subscribers can be connected 5 to a broadband transmission connection established by means of the present invention. The sequence starts (S10) with an identification (S20) made either manually or by means of a computerised search database of a group of people who eventually may be interested in a high speed Internet access possibility. In the next step, these people, for example a whole neighbourhood, are connected (S30) to the modem pool 50 according to the previous sections and referring to either of FIGS. 1, 2 and 3. The modem pool 50 is monitored (S40) by the broadband access control server 70, and as long as no new access possibilities are required, the sequence continues with further connections (S30). If room for new accesses is required, patch corded subscribers are transferred (S50) to direct modems 55. As long as the modem pool is not empty, the sequence continues with monitoring (S40) of broadband access control server 70, but if the modem pool 50 is available, i.e. customers are no longer connected, the modem pool 50 can be removed (S70) by operator staff to another location: This is the end (S80) of one of several conceivable embodiments illustrating various operative sequences.

By means of the invention, the currently connected subscribing customer has immediate access to the Internet and is able to use its customer services provided. The customer can regard the installation as being a so-called plug-and-play solution to access xDSL with accordingly high transmission rates. The operator does not have to be actively involved in the installation procedure, which is performed by the customer himself. However, the operator is of course able to monitor the installation and support the customer if help or support is needed. No bottlenecks will occur if mass-installation and activation of potential broadband customers are made according to this invention, which is a major advantage for customers and well as for operators.

What is claimed is:

1. Apparatus for use in a telecommunication system for providing access to an xDSL telecommunication service to subscribers, comprising:

plural subscriber user terminals;

plural net terminals, each user terminal being coupled to one of the net terminals, and each net terminal including a net terminal xDSL modem;

a first access point including a pool of xDSL modems;

a group of direct access xDSL modems separate from the pool of xDSL modems;

a controller configured to establish a bi-directional broadband connection between multiple user terminals to the first access point using xDSL modems from the pool of xDSL modems, and sometime thereafter, to transfer one or more of the established connections to one or more xDSL modems from the group of direct access xDSL modems.

2. The apparatus in claim 1, further comprising:

loop-back circuitry selectively coupled to one or more net terminals using patch cords.

3. The apparatus in claim 2, further comprising:

a metallic cross connect for coupling one or more of the established connections via the loop-back circuitry to a corresponding xDSL modem in the xDSL modem pool.

4. The apparatus in claim 1, further comprising:

a pool of xDSL filters, wherein the controller is configured to assign each connection established with one of the pooled xDSL modems to one of a pool of xDSL filters, the output of the assigned xDSL filter coupled to the input of the one xDSL modem.

5. An apparatus in a telecommunication system according to claim 4, wherein the pool of xDSL filters is located in the first access point.

6. An apparatus in a telecommunication system according to claim 4, therein the pool of xDSL filters and the direct access xDSL modems are located in the second access point coupled between the first access point and the controller.

7. The apparatus in claim 1, wherein each net terminal further includes an in-band xDSL modem in addition to the net terminal xDSL modem.

8. The apparatus in claim 7, wherein prior to establishment of the bi-directional broadband connection, the in-band modem in the net terminal associated with the one user terminal is configured to establish a preliminary connection with the controller to engage the controller to initialize one of the second xDSL modems from the pool for the bi-directional broadband connection.

9. The apparatus in claim 7, wherein the in-band modem and the net terminal xDSL modem are configured to operate independently and in parallel in the net terminal.

10. An apparatus in claim 7, wherein the controller is configured to retrieve subscriber information to individualize the established connection.

11. A method for use in a telecommunication system for providing access to telecommunication services to subscribers at user terminals, each user terminal being coupled to one of plural net terminals, and each net terminal including a xDSL modem, comprising:

transmitting a user request signal from an net terminal including a user terminal identity;

in response to the user request, searching for an available connection path at the first access point;

creating a bi-directional broadband data transmission connection between the user terminal and the first access point using one of a pool of xDSL modems at the first access point;

activating the bi-directional broadband data transmission connection between the user terminal and the first access point;

transferring the bi-directional broadband data transmission connection from the one xDSL modem from the pool to another, direct access xDSL modem.

12. The method in claim 11, wherein the transfer frees up the one xDSL modem from the pool for a bi-directional broadband data transmission connection for another user.

13. The method in claim 11, further comprising:

using an in-band modem at the net terminal, separate from the xDSL modem at the net terminal, in initially installing the bi-directional broadband data transmission connection.

14. The method in claim 11, wherein one of a pool of xDSL filters at the first access point filters a signal and provides the filtered signal to the one xDSL modem.

15. The method in claim 11, further comprising using the method in claim 3 to establish multiple bi-directional broadband connections with multiple user terminals.

16. The method in claim 11, further comprising using the method in claim 3 to establish simultaneously multiple bi-directional broadband connections with multiple user terminals.

17. The method in claim 11, wherein the direct access modem is located in a second access point.

* * * * *